(12) United States Patent
Yamamoto

(10) Patent No.: US 7,848,339 B2
(45) Date of Patent: Dec. 7, 2010

(54) DATA COMMUNICATION APPARATUS, METHOD FOR ITS NETWORK CONFIGURATION, AND COMPUTER READABLE RECORDING MEDIUM STORING ITS PROGRAM

(75) Inventor: Kazutaka Yamamoto, Sagamihara (JP)

(73) Assignee: Ricoh Company Ltd., Tokyo (JP)

( * ) Notice: Subject to any disclaimer, the term of this patent is extended or adjusted under 35 U.S.C. 154(b) by 69 days.

(21) Appl. No.: 12/367,218

(22) Filed: Feb. 6, 2009

(65) Prior Publication Data

US 2009/0201939 A1 Aug. 13, 2009

(30) Foreign Application Priority Data

Feb. 8, 2008 (JP) .............................. 2008-029696
Dec. 5, 2008 (JP) .............................. 2008-311622

(51) Int. Cl.
*H04L 12/28* (2006.01)

(52) U.S. Cl. ....................... 370/401; 370/255; 370/397; 370/409; 707/966; 707/967

(58) Field of Classification Search ....................... None
See application file for complete search history.

(56) References Cited

U.S. PATENT DOCUMENTS

2008/0301214 A1* 12/2008 Li et al. ....................... 709/201

FOREIGN PATENT DOCUMENTS

JP 2004-040688 2/2004
JP 2005-252596 9/2005

* cited by examiner

*Primary Examiner*—Salman Ahmed
*Assistant Examiner*—Nicholas Sloms
(74) *Attorney, Agent, or Firm*—Oblon, Spivak, McClelland, Maier & Neustadt, L.L.P.

(57) ABSTRACT

A transmission apparatus for participating in a virtual network constructed on a physical IP network, said transmission apparatus including: a node link monitoring unit configured to search an in-subnetwork node, which is a virtual network node existing within a first IP subnetwork that the transmission apparatus belongs to; a gatenode link monitoring unit configured to search an in-subnetwork gatenode, which is a virtual network gatenode existing within the IP subnetwork, wherein the in-subnetwork gatenode is linked to an out-subnetwork node that exists within a second IP subnetwork different from the first IP subnetwork; a detecting unit configured to detect a number of in-subnetwork gatenodes that exist within the first IP subnetwork; and a node link processing unit configured to determine whether a node linked to the transmission apparatus is an out-subnetwork gatenode based on the number of in-subnetwork gatenodes existing within the first IP subnetwork.

13 Claims, 16 Drawing Sheets

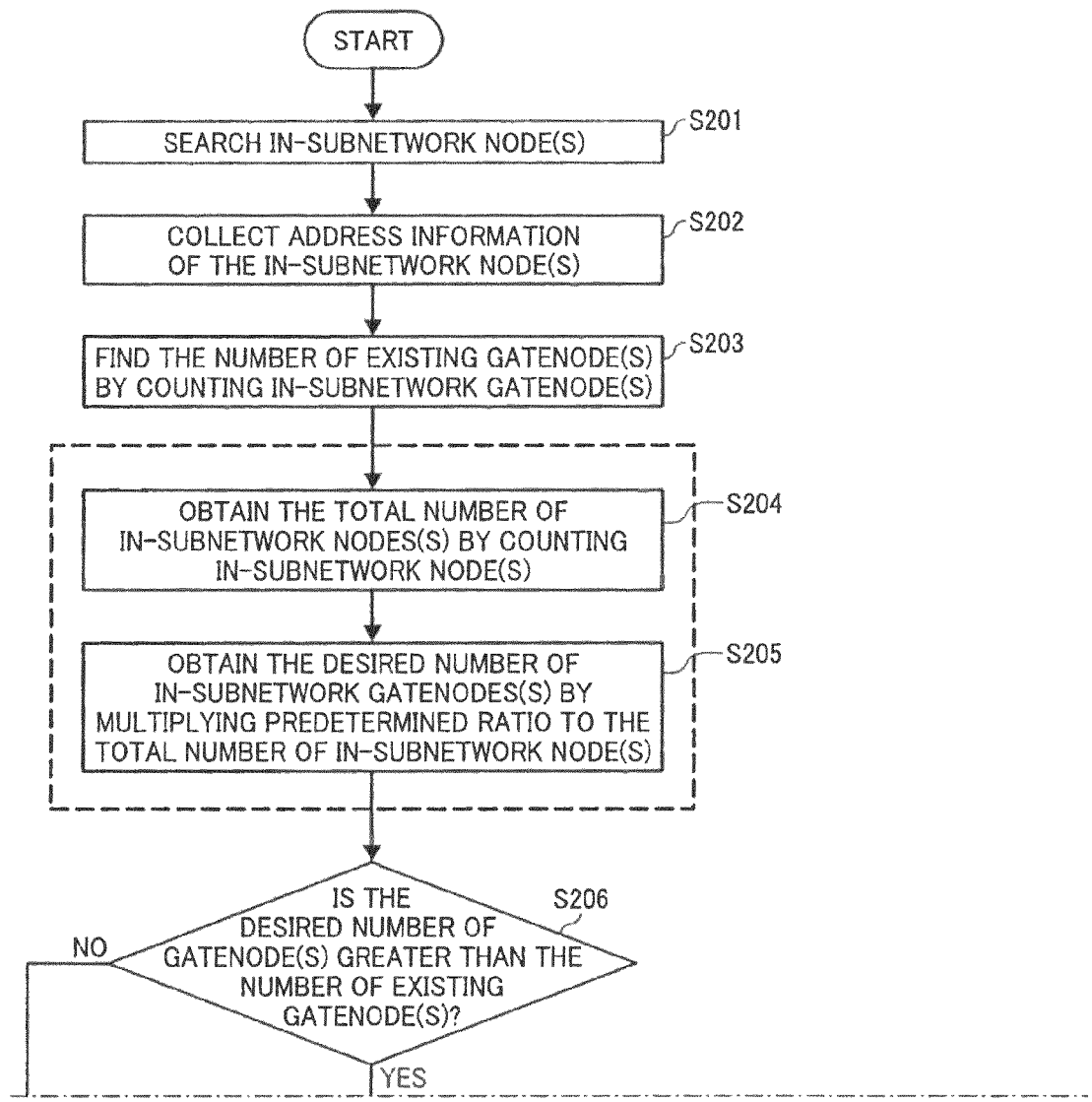

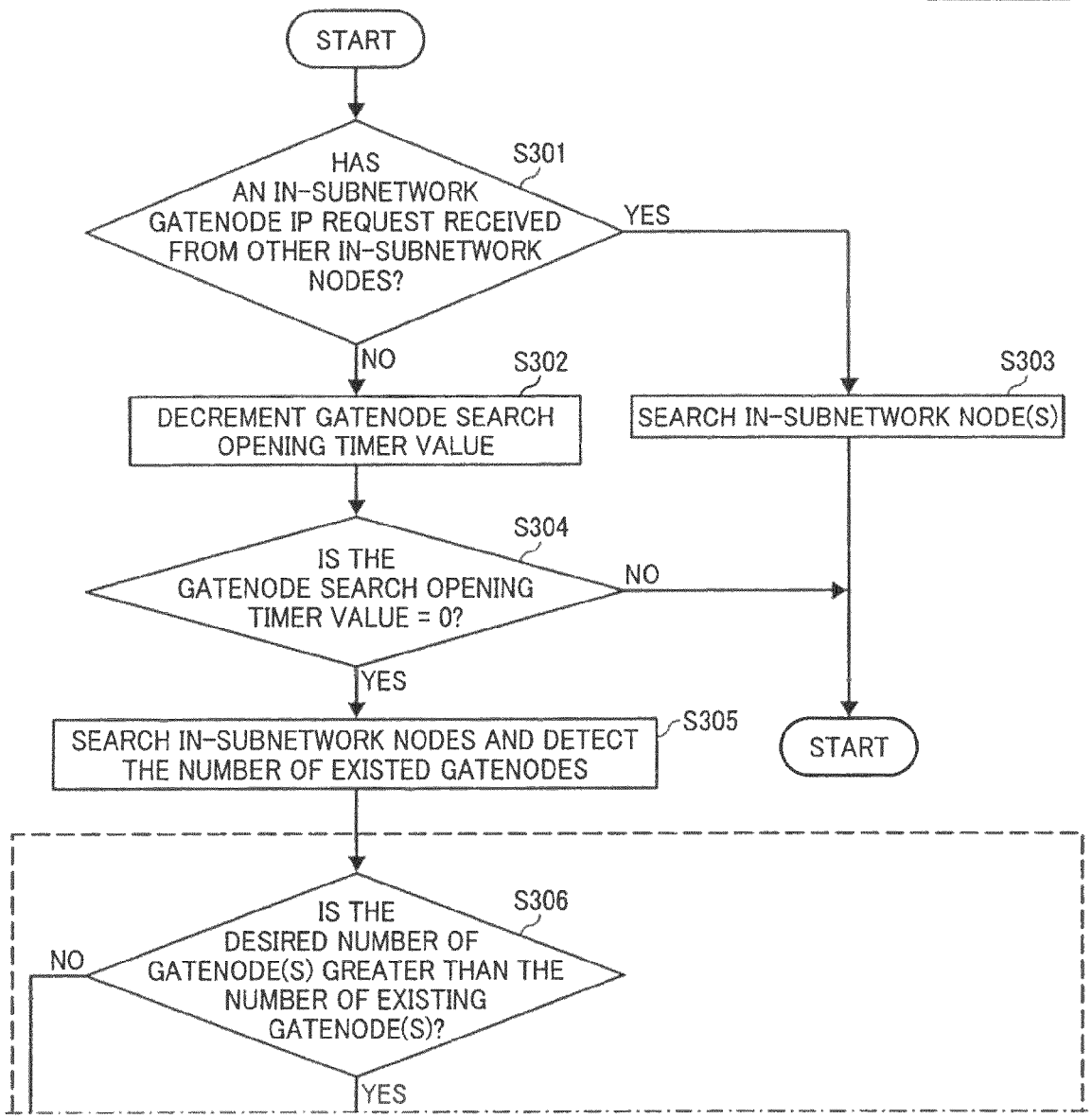

TEMPORARILY-LINK WITH NODE H, AND
ALL IN-SUBNETWORK NODE IP ADDRESS
REQUEST MESSAGE IS SENT TO NODE H

ADDRESS INFORMATION ARE RECEIVED
AS A REPLY TO THE REQUEST MESSAGE

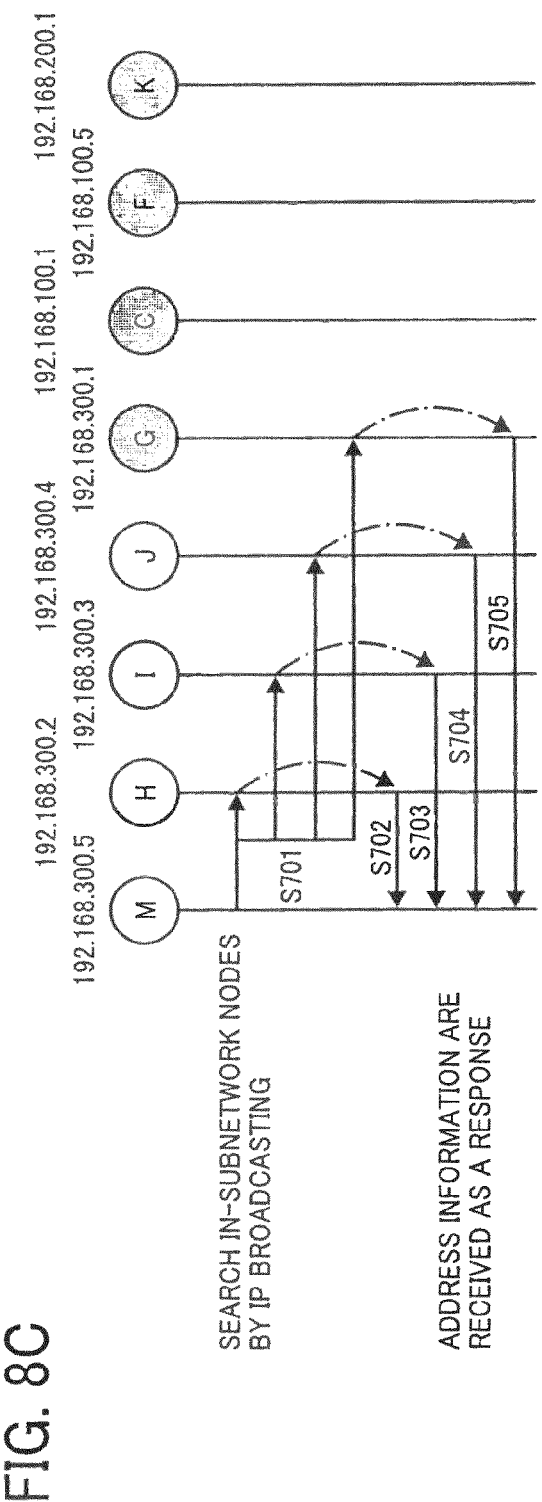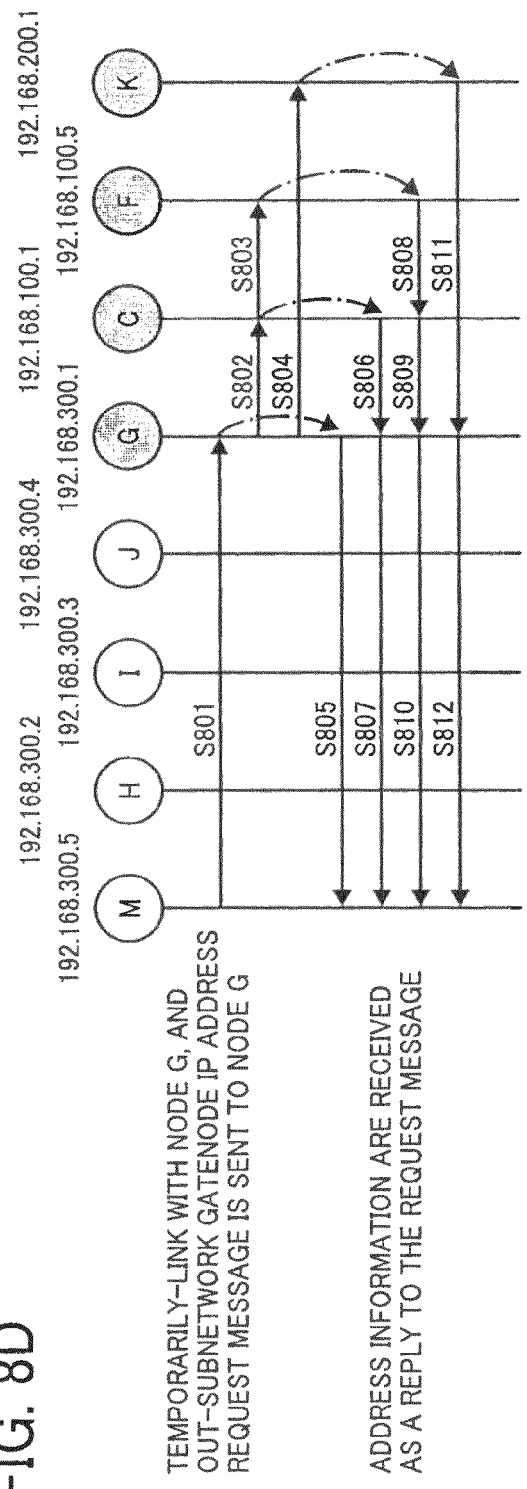

FIG. 9

| IP ADDRESS | LINK FLAG | GATENODE FLAG | TEMPORARY-LINK FLAG |
|---|---|---|---|
| 192.168.300.1 | 0 | 1 | 0 |
| 192.168.300.2 | 0 | 0 | 0 |
| 192.168.300.3 | 1 | 0 | 0 |
| 192.168.300.4 | 2 | 0 | 1 |
| 192.168.100.1 | 1 | 1 | 0 |
| 192.168.100.5 | 0 | 1 | 0 |
| 192.168.200.1 | 2 | 1 | 0 |

FIG. 10

| VIRTUAL NETWORK MESSAGE | TYPE |
|---|---|
| NODE_SEARCH_INNER_ALL | REQUEST |
| NODE_SEARCH_INNER_GATE | REQUEST |
| NODE_SEARCH_OUTER_GATE | REQUEST |
| NODE_RESULT_ADDRESS | RESPONSE |
| APPLI_SEARCH_FILE | REQUEST |
| APPLE_RESULT_FILE | RESPONSE |

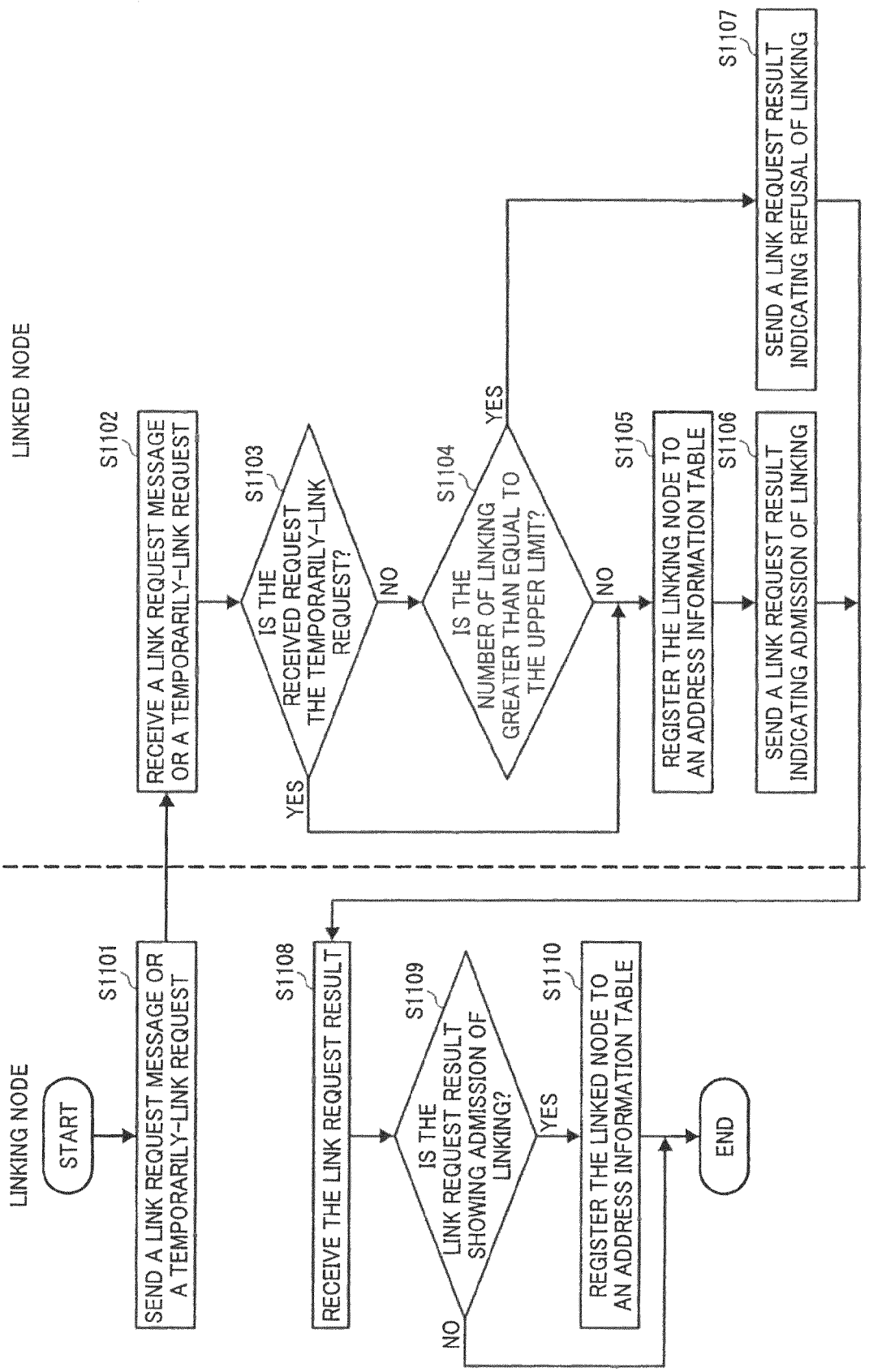

DATA COMMUNICATION APPARATUS, METHOD FOR ITS NETWORK CONFIGURATION, AND COMPUTER READABLE RECORDING MEDIUM STORING ITS PROGRAM

CROSS-REFERENCE TO RELATED APPLICATIONS

This application is based upon and claims priority under 35 U.S.C. §119 to Japanese Patent Application No. 2008-029696, filed Feb. 8, 2008 and No. 2008-311522, filed, Dec. 5, 2008, the entire contents of which are hereby incorporated by reference.

BACKGROUND

1. Technological Field

Exemplary embodiments discussed herein relate to a data communication apparatus, a method for its network configuration, and a computer readable recording medium storing its program.

More particularly, the exemplary embodiments relate to a data communication apparatus that forms a virtual network configured on a physical IP network in a non-structural topology which is independent of data placement, a node within the virtual network that transmits data to its physically adjacent node, and a method for configuring a virtual network of the same.

2. Description of the Related Art

Recently, P2P (Peer to Peer/Personal to Personal) networks have received more attention. In the P2P network, computers do not have any distinct roles such as a server computer or a client computer and evenly communicate with each other. It is said that the P2P network model is strong in scalability and fault tolerance because data and the load are distributed. Various applications using the P2P network model have been developed. For example, there is Gnutella software which allows files to be shared and opened to the public over a plurality of terminals.

The Gnutella software logically configures the virtual network of non-structured topology, which is independent from data placement. A search of all files stored in every node takes place by distributing a search query to all nodes as each node transfers the search query to an adjacent node.

Therefore, searching requires that a large amount of messages be exchanged, and this causes a problem of increased traffic.

Gnutella software configures the virtual network without considering physical routing of the IP network. As a result of this, there are many cases where adjacent nodes in the virtual network are physically distanced, and this is one cause of the increased traffic.

There are some conventional methods to reduce the traffic of the physical network and to efficiently determine the virtual network topology. Japanese laid open patent JP2005-252596 describes technology that measures response time for connecting between peers. However, there is a problem that a determination of the adjacent node cannot be accurate, since the response time may largely change from the load condition of the peer or the communication line in this technology.

In the conventional P2P network configuration methods, there are the following problems.

If a virtual network is configured to have nearly the same shape as the physical network, useless messages may be transmitted. Although, the conventional method requires massive communication traffic to measure a physical distance between nodes, it is difficult to measure the physical distance accurately. Further, the operation of the conventional method is also complex.

When the node decides to participate in the virtual network, the node connects to an already-known node by using a method of querying a server (which still requires that the address of the server be inputted). Therefore, the user has to be aware of the virtual network when participating in the virtual network.

The performance of the conventional network decreases if there are not enough gatenodes. If there are many gatenodes, the communication load between gatenodes goes up.

Having a virtual network configuration similar to the physical network configuration means that a plurality of virtual network node groups are connected with a small number of lines, since the IP network connects to a plurality of networks via a router(s).

In addition, the virtual network, such as P2P network, is often composed of the terminal, and nodes frequently join the virtual network or secede from the virtual network. Therefore, since a gatenode which connects a plurality of virtual network node groups may secede from the virtual network, decoupling of the virtual network may easily occur.

It is better to have more gatenodes so that the virtual network can be stable against participation and secession of the node. However, there is a problem that the communication performance decreases when links to nodes out of the subnetwork increases.

SUMMARY

One of the objects of the exemplary embodiments described herein is to provide a transmission apparatus for participating in a virtual network constructed on a physical IP network. An exemplary embodiment of the transmission apparatus includes: a node link monitoring unit configured to search an in-subnetwork node, which is a virtual network node existing within a first IP subnetwork that the transmission apparatus belongs to; a gatenode link monitoring unit configured to search an in-subnetwork gatenode, which is a virtual network gatenode existing within the IP subnetwork, wherein the in-subnetwork gatenode is linked to an out-subnetwork node that exists within a second IP subnetwork different from the first IP subnetwork; a detecting unit configured to detect a number of in-subnetwork gatenodes that exist within the first IP subnetwork; and a node link processing unit configured to determine whether a node linked to the transmission apparatus is an out-subnetwork gatenode based on the number of in-subnetwork gatenodes existing within the first IP subnetwork.

BRIEF DESCRIPTION OF THE DRAWINGS

Other objects, features and advantages of the exemplary embodiments described herein will become more apparent from the following detailed description when read in conjunction with the accompanying drawings, in which:

FIG. 8(C) is a flowchart showing a method to obtain address information of in-subnetwork nodes using a broadcast message in the IP network, FIG. 8(D) is a flowchart showing a method to obtain address information of out-subnetwork gatenodes using message in the virtual network, FIG. 9 is a table showing an address information table of each node, FIG. 10 shows examples of messages passing through the virtual network, and FIG. 11 is a flowchart showing behavior of the node link processing unit.

DETAILED DESCRIPTION

The virtual network of the exemplary embodiments described herein include a mesh topology and is composed of computers, called servants, which do not have any distinct roles such as a server computer or a client computer.

In an exemplary embodiment, an application shares files distributed to servants, and searching and obtaining the files are generally done by following three steps: send a search request message; receive search result, and receive a file(s). A servant which is a search request source sends a search request message which includes keywords for retrieving a target file.

The search request message is sent to all servants in a "bucket brigade method" (i.e., one after the other). A servant which received the search request message retrieves a file name, an alias name, metafile information or other information concerning the file, and sends it back as a search result (retrieved file name, address information or the like). The search result is received by the search request source servant via an inverse route of where the search request message has been sent.

Then, the search request source servant receives the search results from each of the servants, selects the target file, connects to a servant which stores the target file, and receives the target file from the servant.

Files can be freely stored in any servant, since the topology of this system is non-structured without considering data placement for retrieving. Further, in non-structured mesh topology, there is a low possibility that the communication channel decouples if one servant secedes from the virtual network, and it is robust against changes in participation and secession of servants. Servants can easily participate in the virtual network by linking to any servant which is participating in the virtual network. On the other hand, increasing traffic is viewed in suspicion as being caused by flooding communication.

The word "node" is used in the explanation thereafter instead of the servant though the data communication apparatus located in a connected point on the network is generally called a node.

Figure 1:
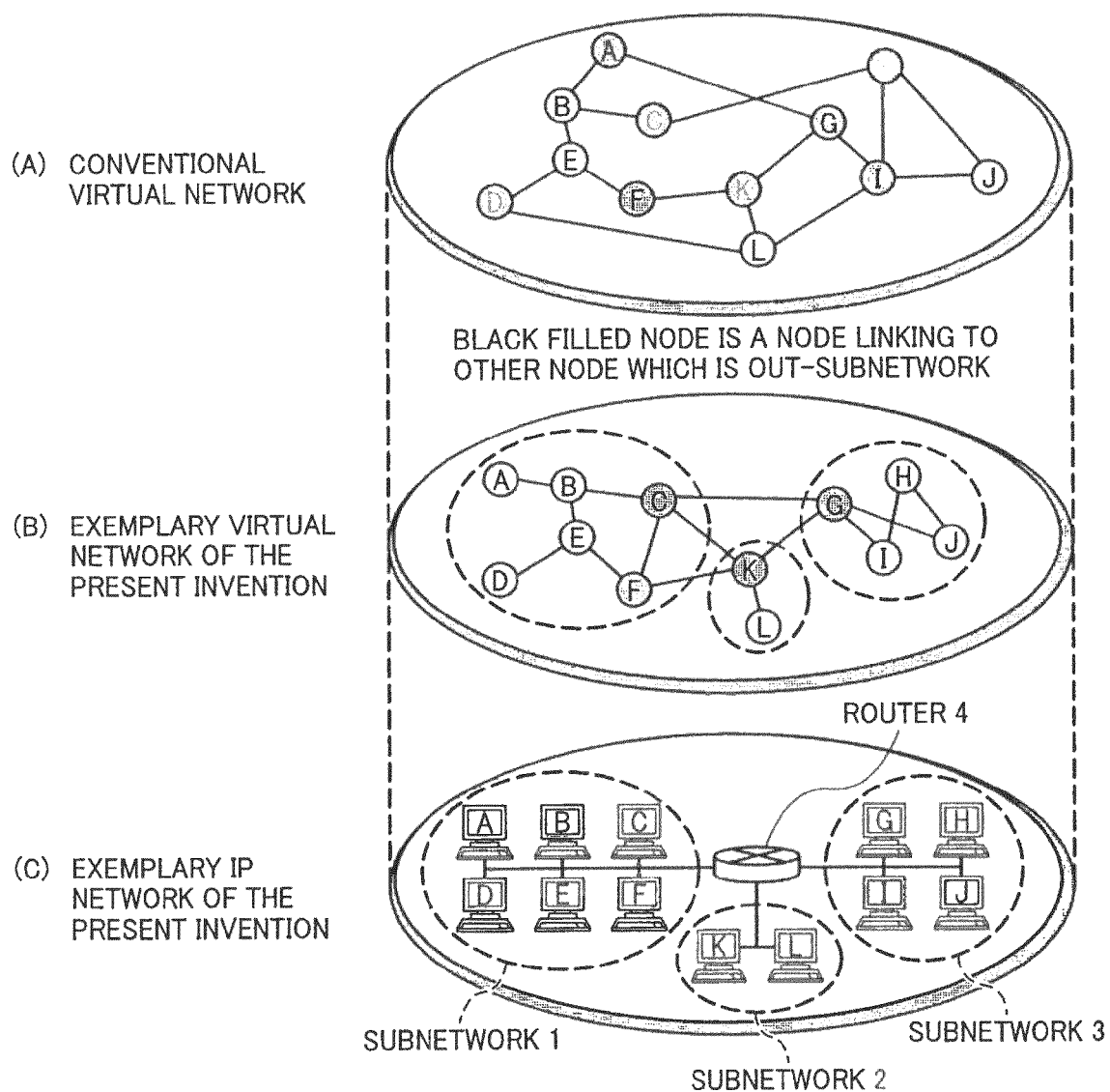
FIG. 1(A) is a diagram showing the conventional virtual network which is composed using conventional ways.
FIG. 1(B) is a diagram showing a virtual network composed by applying an exemplary embodiment.
FIG. 1(C) is an IP network which is composed of three subnetworks and a router 4 which connects the subnetworks.

FIGS. 1A-C are diagrams showing how a Physical IP network, a conventional virtual network overlaid on the IP network, and an exemplary virtual network of the present invention are different. FIG. 1(C) is an IP network which is composed of 6 PCs (A, B, C, D, E and F) in subnetwork 1, 2 PCs (K and L) in subnetwork 2, 4 PCs (G, H, I, J) in subnetwork 3, and a router 4 which connects the three subnetworks. However, PCs are capable of communicating to other PCs in the same subnetwork in one hop, and two hops are required in case of communicating to a PC in a different subnetwork.

FIG. 1(A) is a diagram showing the conventional virtual network which is composed of the 12 PCs (A to L) using conventional ways. FIG. 1(B) is a diagram showing a virtual network composed by an exemplary embodiment of the present invention. The virtual network of the present embodiment is a sparse mesh topology while the conventional virtual network is a close meshed topology.

A node of the conventional virtual network links to another node regardless of the position or the distance of the other node. A node of the present embodiment of a virtual network only links to another node in the same subnetwork, and only a few gatenodes link to the nodes in a different subnetwork. In this embodiment, a node connecting to another node in a different subnetwork is called a "gatenode". Nodes with a filled circle in the virtual network of the conventional and present embodiments indicate a node connected to another node in a different subnetwork.

Thus, the virtual network of the exemplary present embodiment has 4 nodes (C, F, K and G) as gatenodes while the conventional virtual network has 9 nodes (A, C, D, F, G, H, I, K and L) as gatenodes. FIG. 1(B) shows this, wherein the number of filled circles in the virtual network is less than the number of filled circles in the conventional virtual network (FIG. 1(A)).

Since communication in a subnetwork in FIG. 1(C) does not necessarily have to pass through router 4 and the number of gatenodes can be reduced in the manner of the exemplary embodiment shown in FIG. 1(B), the amount of packets passing through the router 4 will decrease and efficient communication through the virtual network can be achieved with a small number of hops in the physical network.

Figure 2:
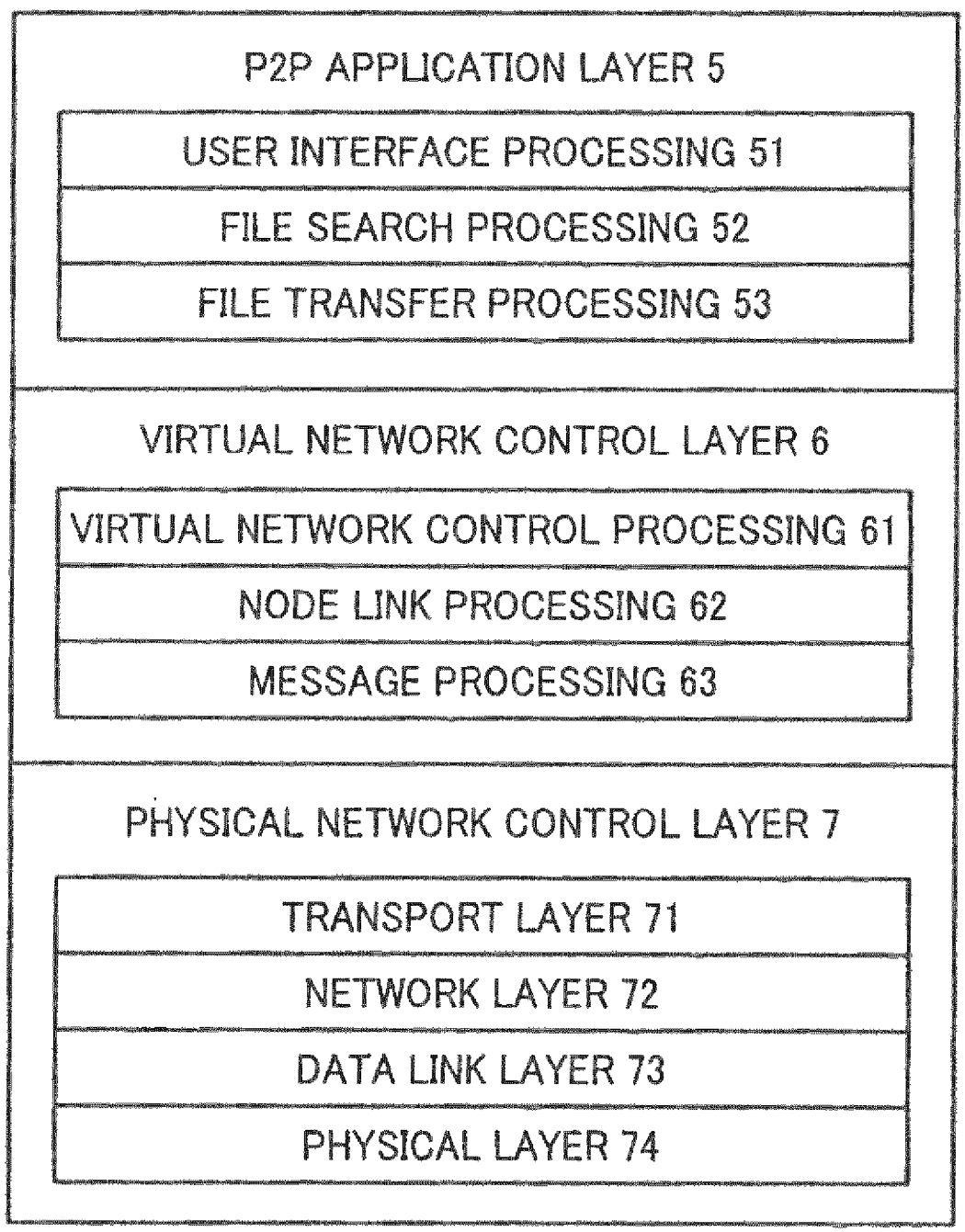
FIG. 2 is a diagram showing a software architecture of an exemplary embodiment.

FIG. 2 is a diagram showing an exemplary software architecture of the present embodiment. A lower layer in FIG. 2 is a physical network control layer 7, which includes transport layer 71, network layer 72, data link layer 73, and physical layer 74. The physical network control layer enables TCP/IP (Transmission Control Protocol/Internet Protocol) communication.

A middle layer in FIG. 2 is a virtual network control layer 6, which includes virtual network control processing 61, node link processing 62, and message processing 63. The virtual network control layer enables construction and maintenance of the virtual network and performs message processing.

An upper layer in FIG. 2 is a P2P application layer 5, which includes user interface processing 51, file search processing 52, and file transfer processing 53. The PSP application layer enables publication, searching, and obtaining a user interface and/or one or more files.

Figure 3:
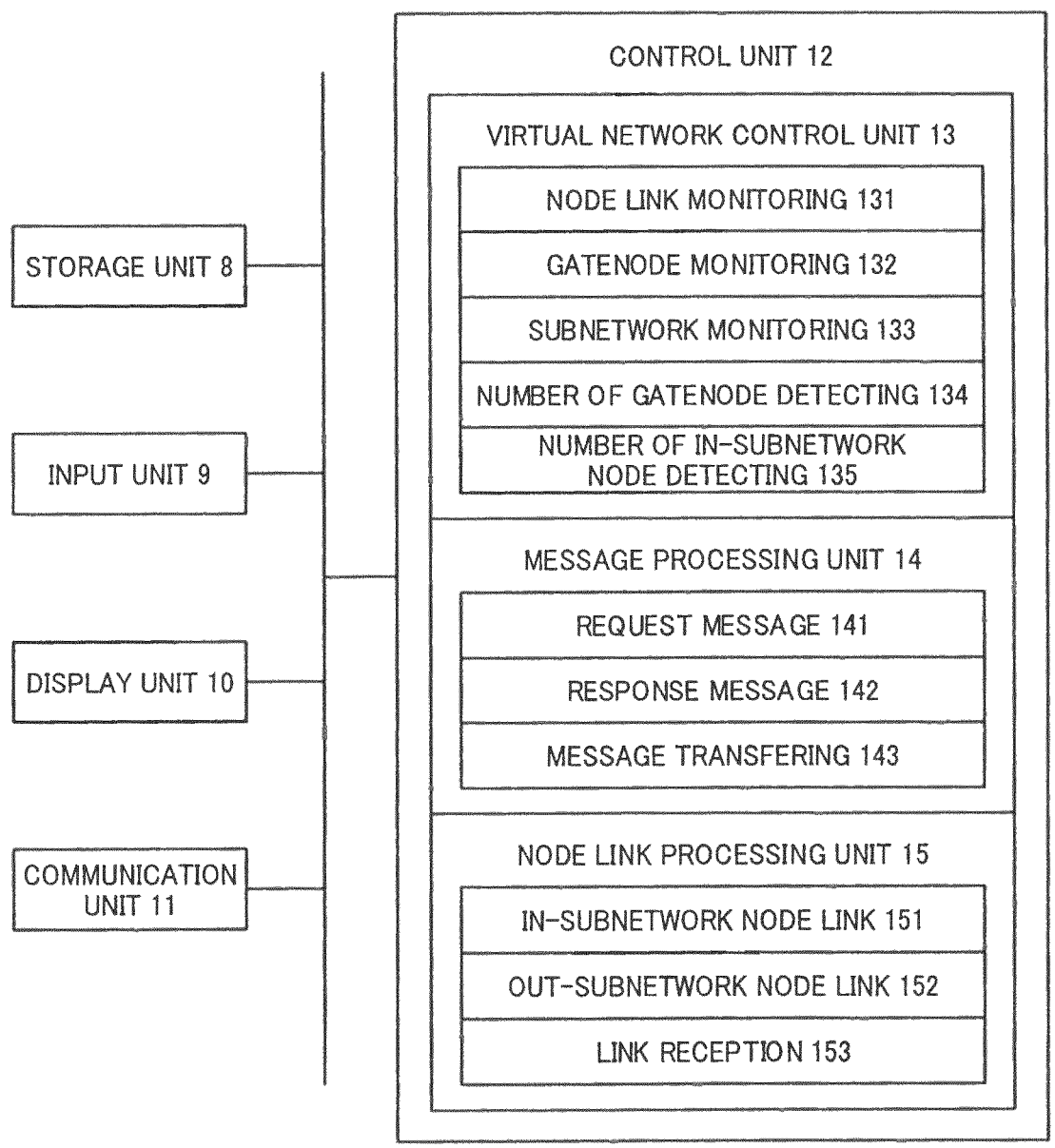
FIG. 3 is a schematic diagram of the transmission apparatus in an exemplary embodiment.

FIG. 3 is a diagram of the data communication apparatus expressed as a PC or a node in the present embodiment. A control unit 12 is composed of computing units and memories such as CPU, RAM, ROM, or the like, and is a device that executes software. A storage unit 8 is a HDD, flash memory, or other storage device that is capable of recording programs or data.

An input unit 9 is a mouse device, keyboard, touch panel, or the like, and receives instructions concerning file searches and keyword(s) input from a user.

A display unit 10 is a CRT or LCD display, and displays search results or contents of file(s).

A communication unit 11 is a LAN device such as Ethernet, wireless LAN device such as IEEE802, 11a/b/g or the like, and utilizes TCP/IP or UDP/IP communication.

Modules of the virtual network control layer 6 are provided in the control unit 12. The virtual network control layer 6 is composed of a virtual network control unit 13 which executes processing of the virtual network control processing 61, a message processing unit 14 which executes processing of the message processing 63, and a node link processing unit 15 which executes processing of the node link processing 62.

The Node link processing unit 15 includes "in-subnetwork node link function 151", "out-subnetwork node link function 152" and "link reception function 153". The in-subnetwork node link function 151 and the out-subnetwork node link function 152 have functions that search and detect in/out-subnetwork nodes and establish TCP/IP communication connections (links) with a predetermined number of nodes (linked nodes). Further, the in-subnetwork node link function 151 and the out-subnetwork node link function 152 also have a function of disconnecting the TCP/IP communication connection and trying to link to other nodes, when a link refusal message indicating refusal of a link request is received. The link reception function 153 has a function that establishes a TCP/IP communication connection in response to a link request sent from other nodes. Further, the link reception function 153 has a function that sends a link refusal message, if the link request can not be granted.

The message processing unit 14 includes "request message function 141", "response message function 142" and "message transferring function 143". The request message function 141 is a function that generates a request message, and sends or receives the request message. The response message 142 function is a function that generates a response message, and sends or receives the response message. The message transferring function 143 is a function that transfers a message(s) sent from one node(s) to the other node(s).

In a process referred to as "flooding", a node receives the request message (a reception node) and transfers the received request message to other node(s) to which the reception node is linked, except to the node which sent the request message to the reception node.

Each request message has a unique ID (message ID) so as to differentiate between different request messages, when a plurality of request messages are received.

A node that receives a same request message a second time disposes of the second received request message without transferring it.

The request message has a counter value, and a node(s) decrements the counter value when the node copies and transfers the request message. The request message having a counter value=0 will be disposed of without transferring. Then a node(s) which transfers the request message stores request message control information which associates a node(s) that sent the request message and the message ID as a record of the request message control table in the storage unit 8. The node stores the request message control information, even if the request message is the same but a node which sends the request message is different.

A response message which is a reply to the request message reaches to a node which publishes the request message (publisher node) by the message transferring function 143. A node which generates a response message to the request message identifies a node(s) which sent the request message with reference to the request message control table of its storage unit 8, and sends the response message to the identified node(s). The node which sends the response message sets a transferring flag, which indicates that the response message is already sent, to a record which has a same message ID within the request message control table of its storage unit 8. The response message is disposed of, if there is no request message which has a same message ID in the request message control table in its storage unit 8.

The virtual network control processing unit 13 has functions that include "node link monitoring function 131", "gatenode monitoring function 132", "subnetwork monitoring 133", "number of gatenode detecting 134", and "number of in-subnetwork node detecting 135".

The node link monitoring function 131 is a function that confirms whether communication connection to the other node(s) is maintained. The node link monitoring function 131 sends an instruction indicating "link to new node(s)" to the node link processing unit 15 if the communication connection is terminated.

The gatenode monitoring function 132 is function that confirms how many gatenodes there are in a subnetwork in which the node belongs and executes a process to become a gatenode if there are less than a predetermined number of gatenodes.

The subnetwork monitoring 133 is function that determines whether a node(s) having a certain IP address is in a same subnetwork by using a subnetwork mask.

The number of gatenode detecting function 134 and number of in-subnetwork node detecting function 135 are functions that probe the number of current existing gatenodes or in-subnetwork node(s) and their addresses. There are two ways to probe; one is using a request message in the virtual network, and the other is using broadcasting in the IP network.

FIG. 10 shows examples of messages that pass through the virtual network. Messages are classified as either a request message or a response message. The response message is a response to the request message. Hereafter, each message is explained. NODE_SEARCH_INNER_ALL (all in-subnetwork node IP address request message, NSIA request message) is a request message to collect IP addresses of all in-subnetwork nodes.

NODE_SEARCH_INNER_GATE (in-subnetwork gatenode IP address request message, NSIG request message) is a request message to collect IP addresses of in-subnetwork gatenodes.

NODE_SEARCH_OUTER_GATE (out-subnetwork gatenode IP address request message, NSOG request message) is a request message to collect IP addresses of out-subnetwork gatenodes.

NODE_RESULT_ADRESS (address response message, NRA response message) is a response message including node address information, for example IP address, sent in response to the request message.

APPLI_SEARCH_FILE (file search request message) is a request message from the P2P application program to request a search of a file. A node which receives a file search request message searches a file which meets the search query included in the file search request message from the storage device and generates a list of file names and file sizes or the like.

APPLI_RESULT_FILE (file search result response message) is a response message from the P2P application program to respond to the file search request message. A node which receives a file search request message sends the list along with the file search request message to a node which publishes the file search request message as a response to the file search request message.

Various other content may be included in a message.

Figure 4:
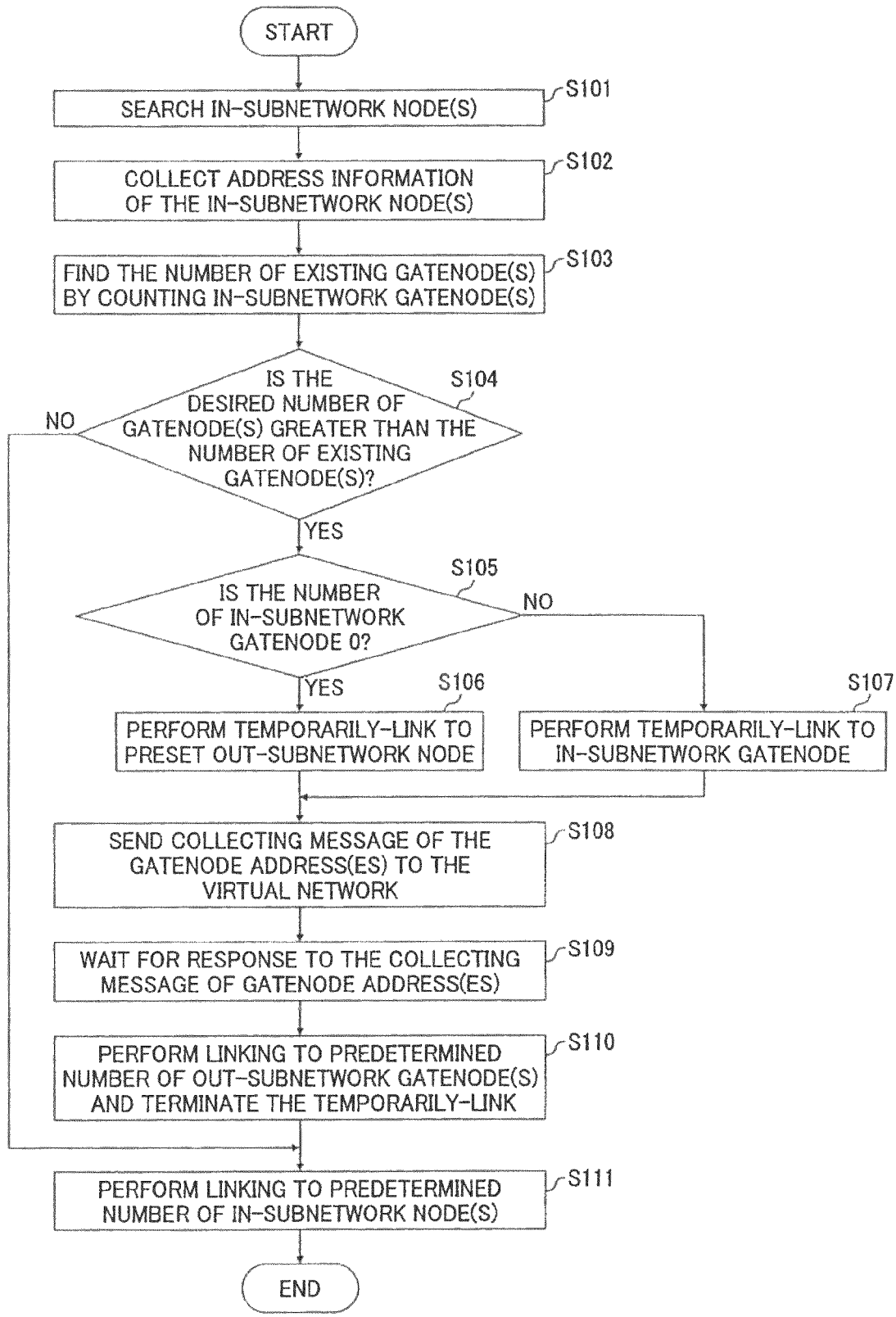
FIG. 4 is a flowchart showing a process when a node is participating in the virtual network.

FIG. 4 is a flowchart showing a process when a node is participating in the virtual network. A node which is participating in the virtual network (participating node) searches in-subnetwork node(s) (Step S101), and collects address information of in-subnetwork node(s) (Step S102). As a result of Step S101 and S102, the participating node can obtain an IP address of a node(s) and attempt to link to it. There are two ways to obtain an IP addresses. A first way is a method using messages in the virtual network, which collects address information of in-subnetwork node(s) using the all in-subnetwork node IP address request message after linking to a known in-subnetwork node. A second way is a method using broadcast in the IP network.

The methods to obtain IP address(es) are explained by using FIG. 8(A) to FIG.8(E).

Figure 8A:
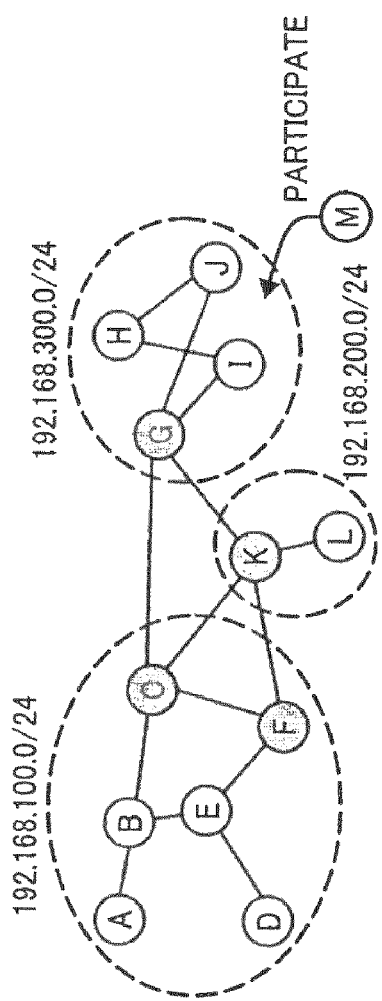
FIG. 8(A) is a diagram showing a participating node (in here, Node M) that is participating in subnetwork 3 of the virtual network shown in FIG. 1(B)
Figure 8B:
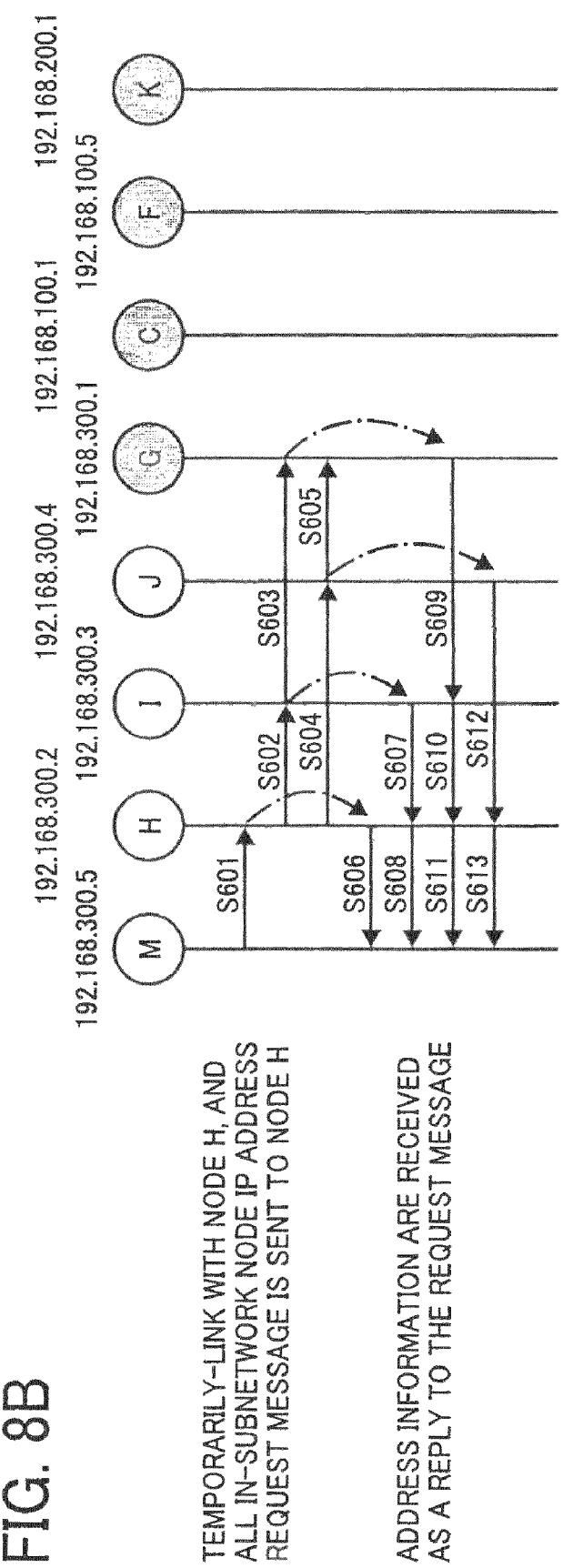
FIG. 8(B) is a flowchart showing a method to obtain address information of in-subnetwork nodes using messages in the virtual network.

FIG. 8(A) is a diagram showing a participating node (Node M) in subnetwork 3 of the virtual network shown in FIG. 1(B). FIG. 8(B) is a flowchart showing a method to obtain address information of in-subnetwork nodes using messages in the virtual network. Node M temporarily links to Node H using an IP address which is presented by a user. After the temporary link is established, Node M sends a NSIA request message (NODE_SEARCH_INNER_ALL (all in-subnetwork node IP address request message)) to Node H (S601). Node H receives the NSIA request message and transfers the NSIA request message to Node I and Node J, as they are connected with Node H (S602, S604). Node H sends NRA response message of Node H (NODE_RESULT_ADDRESS (address response message)) which is a response to the NSIA request message, to Node M (S606). Thus, Node M receives address information of Node H. Node I receives the NSIA request message from Node H and transfers the NSIA request message to Node G (S603). Node I sends NRA response message of Node I to Node H (S607). Node H receives the NRA response message of Node I and sends it to Node M (S608). Thus, Node M receives address information of Node I. Node J receives the NSIA request message from Node H and transfers the NSIA request message to Node G (S605). Node J sends NRA response message of Node J to Node H (S612). Node H receives the NRA response message of Node J and sends it to Node M (S613). Thus, Node M receives address information of Node J. Node G receives the NSIA request message from Node I and Node J (S603, S605). In this case, Node G receives the NSIA request message from Node I prior to Node J, so Node G disposes of the NSIA request message from Node J and sends NRA response message of Node G to Node I (S609) Node I receives NRA response message of Node G and transfers it to Node H (S610). Node H receives the NRA response message of Node G from Node I and transfers it to Node M (S613). Thus, Node M receives address information of Node G.

After collecting address information of in-subnetwork nodes, Node M terminates the temporary link to Node H.

FIG. 8(C) is a flowchart showing a method to obtain address information of in-subnetwork nodes using broadcast in the IP network. Node M broadcasts a request UDP packet, a request for address information, to a broadcast address (S701). The request UDP packet is received by Node G, Node H, Node I and Node J in subnetwork 3. Each node that received the request UDP packet sends a response UDP packet including address information of each node to Node M by unicast (S702, S703, S704 and S705). Node M receives the response UDP packet from each node, and thus node M collects address information of in-subnetwork nodes.

However, IP broadcast in a physical network is commonly used for searching devices that exist in a S same subnetwork. Applying the IP broadcast to the present embodiment enables a limited search region and automatic searching simultaneously.

FIG. 9 is a table showing an address information table that each node (here, Node G is shown as an example) sends to a participating node (here, Node M as an example). While address information of Node G is used for explanation, every node functioning as a virtual network node has its own address information table and sends it to the participating node (Node M). The first column of the address information table stores IP address(es) of the nodes which Node G communicates with by functioning as virtual network node. The second column of the address information table stores a link flag. A link flag is a flag showing whether Node G is linked to a node of the row. Link flag is set to 0 for Node G when it is not connected at all, 1 for being a linking node to the node, and 2 for being a linked node to the node. A linking node is a node that sends a link request, and a linked node is a node that receives the link request. The third column of the address information table stores a gatenode flag. A gatenode flag is a flag showing whether the node is a gatenode or not. Gatenode flag is set to 0 if it is not a gatenode and 1 if it is a gatenode. The fourth column of the address information table stores a temporary link flag. A temporary link flag is a flag showing whether a connection between the node and Node G is a temporary link or not. The temporary link flag is set to 0 when the connection is not a temporary link and 1 when the connection is a temporary link.

As shown FIG. 9, the Node having IP address [192. 168. 300. 4] (node in forth row) is temporarily-linked with node G. Further, the node in first row having IP address [192. 168. 300. 1] is Node G.

Returning to FIG. 4, the steps after collecting address information of in-subnetwork nodes is further explained.

The participating node counts the gatenodes in the address information and finds the number of gatenodes existing in the in-subnetwork (the number of existing gatenodes) (Step S103). Then the participating node determines whether the number of existing gatenodes is less than a desired number of gatenodes (Step S104). If the number of existing gatenodes is greater than or equal to the target number of gatenodes (NO in Step S104), the process proceeds to Step S111. If the number of desired gatenodes is less than the target number of gatenodes (YES in Step S104), the participating node determines whether the number of existing gatenodes is 0 (Step S105). If the number of existing gatenodes is not 0 (NO, in Step S105), then the participating node tries to temporarily link to an in-subnetwork gatenode (Step S107). If the number of existed node is 0 (YES, in Step S105), then the participating node tries to temporarily link to an out-subnetwork gatenode (Step S106). The out-subnetwork gatenode can be a node which is manually input by a user or a node which has an IP address obtained from a directory server. After temporarily-linking to an out/in-subnetwork gatenode, the participating node collects address information of the out/in-subnetwork gatenode in using a NSOG request message (NODE_SEAR- CH_OUTER_GATE (out-subnetwork gatenode IP address request message)) (Step S108).

FIG. 8(D) is a flowchart showing a method to obtain address information of out-subnetwork gatenodes using a message in the virtual network.

Node M tries to temporarily link to Node G (in-subnetwork gatenode) using an IP address of the address information table. After the temporary link is established, Node M sends a NSOG request message (NODE_SEARCH_OUTER_GATE (out-subnetwork gatenode IP address request message)) to Node G (Step S801). Node G receives the NSOG request message and transfers the NSOG request message to Node C, and Node K, which are connected with Node G (Steps S802, S803 and S804). Node G sends a NRA response message of Node G (NODE_RESULT_ADDRESS (address response message)) to Node M (Step S805). Node C receives the NSOG request message from Node G and transfers it to Node F. Node C sends NRA response message of Node C to Node G (Step 806), and Node G transfers it to Node M (Step S807). If Node C receives NSOG request message from Node K while Node C already received NSOG request message from Node G, Node C can then dispose of the NSOG request message received from Node K and stores only information concerning reception of the NSOG request message received from Node K. Node F receives the NSOG request message from Node C and sends an NRA response message of Node F to Node C (Step S808). Node C receives NRA response of Node F and transfers it to Node G (Step S809). Node G receives NRA response of Node F and transfers it to Node M (Step S810). Node K receives the NSOG request message from Node G and sends NRA response message of Node K to Node G (Step S811). Node G receives the NRA response message and transfers it to Node M (Step S812). As a result of this process, Node M receives address information of the out-subnetwork gatenodes.

Any node which receives a plurality of NSOG request messages from different nodes only keeps the first NSOG request message and disposes of the other NSOG request messages. When a node disposes of a NSOG request messages, the node stores information concerning nodes which sent the NSOG request messages.

Returning to FIG. 4, the steps after collecting address information of the out-subnetwork gatenodes is further explained.

The participating node links to a predetermined number of gatenodes and terminates the temporary link after collecting address information of out-subnetwork address information (Step S110). The participating node links to a predetermined number of in-subnetwork nodes after linking to the out-subnetwork gatenodes (Step S111).

If the number of existing gatenodes exceeds (greater than or equal to) the desired number of gatenodes, the participating node does not link to out-subnetwork gatenodes and only links to the predetermined number of in-subnetwork nodes.

Figure 5B:
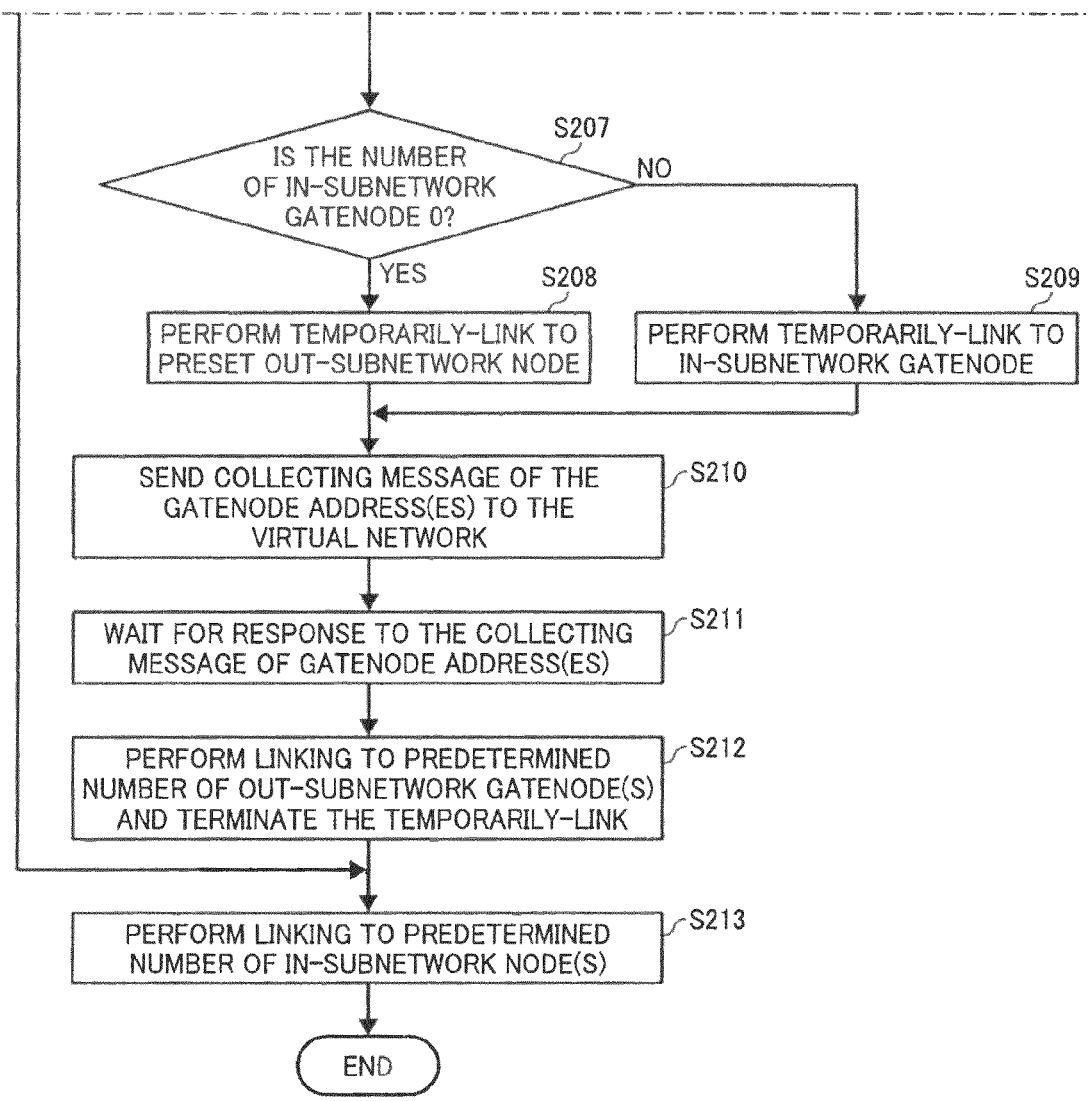
FIG. 5 is a flowchart showing a first alternative process when a node is participating in the virtual network.

FIG. 5 is a flowchart showing a process when a node is participating in the virtual network. The process shown in FIG. 5 has additional steps not included in FIG. 4, which are directed toward finding the number of gatenodes.

The additional processes are Steps S204 and S205, which are framed by the broken rectangle. Other steps of FIG. 5 are similar to what was explained with respect to FIG. 4 and are not further described in detail. S201 corresponds to S101, S202 corresponds to S102, S203 corresponds to S103, S206 corresponds to S104, S207 corresponds to S105, S208 corresponds to S106, S209 corresponds to S107, S210 corresponds to S108, S211 corresponds to S109, S212 corresponds to S110 and S213 corresponds to S111. Explanation for these steps is abbreviated.

The participating node counts in-subnetwork nodes based on address information of in-subnetwork nodes and finds the number of in-subnetwork nodes after finding the number of existing gatenodes in Step S203 (Step S204). It is efficient if this process simultaneously takes place with a process of finding the number of existing gatenodes (Step S203). Then, the participating node calculates the desired number of gatenodes by multiplying the number of in-subnetwork nodes by a predetermined ratio (Step S205). As an example, the desired number of gatenodes is preferred to be about 4% of the total number of in-subnetwork nodes and a lower limit on the number of gatenodes is 2.

Figure 6B:
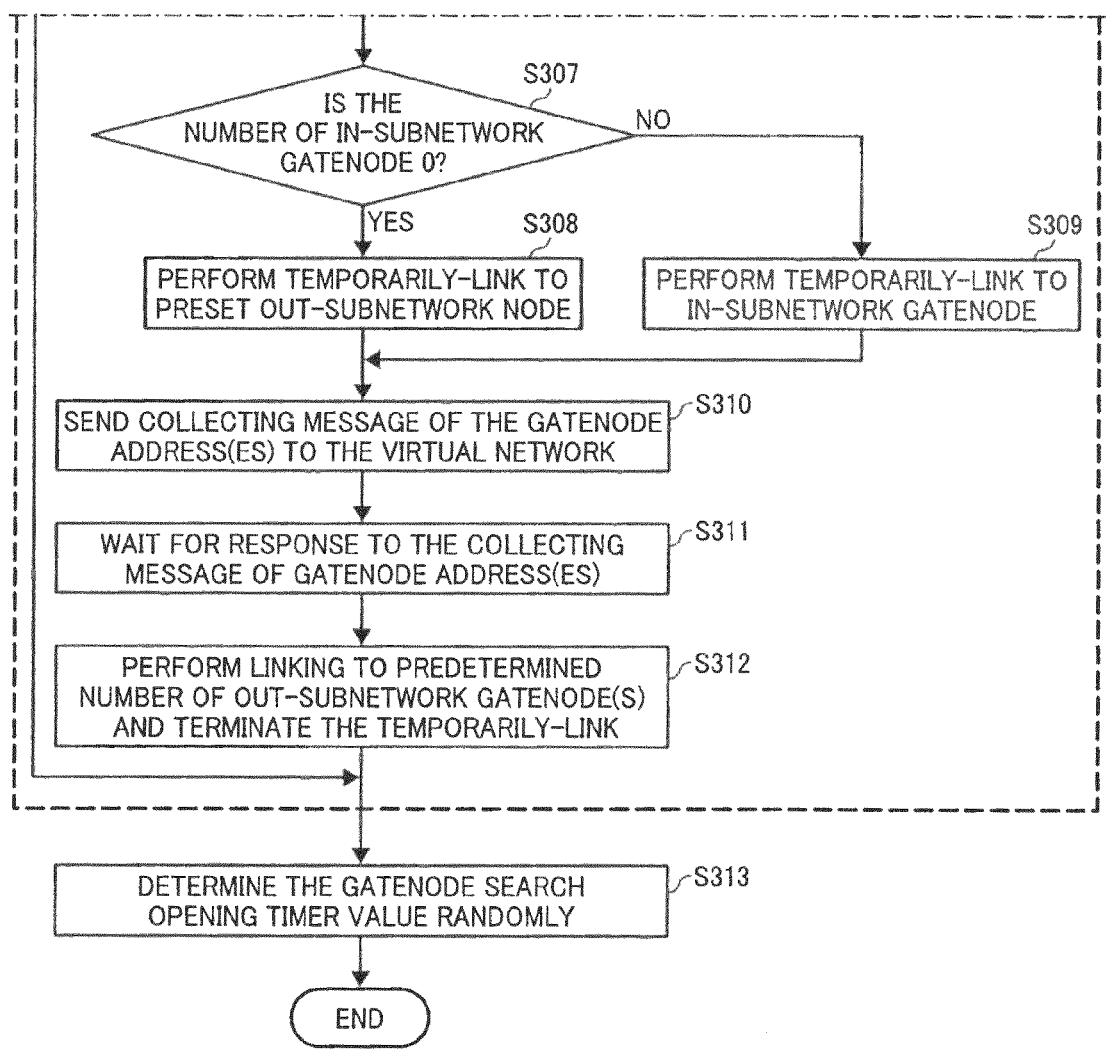
FIG. 6 is a flowchart showing a second alternative process when a node is participating in the virtual network.

FIG. 6 is a flowchart showing a process when a node is participating in the virtual network. In FIG. 6, a participating node identifies the number of existing gatenodes, and becomes a gatenode if the number of existing gatenodes is too low. In FIG. 6, the steps framed in the broken rectangle are similar to steps of FIG. 4. S306 corresponds S104, S307 corresponds S105, S308 corresponds S106, S309 corresponds S107, S310 corresponds S108, S311 corresponds S109 and S312 corresponds S110, so explanation for these steps are abbreviated.

The process in FIG. 6 may take place once every time interval, which may be a one second interval, for example.

The participating node confirms whether other nodes have searched for gatenodes (Step S301). This confirmation can be easily done by checking a confirmation table which sets a flag whenever a NSIA request message (NODE_SEARCH_INNER_ALL (all in-subnetwork node IP address request message)) or NSIG request message (NODE_SEARCH_INNER_GATE (in-subnetwork gatenode IP address request message)) is received. If either NSIA request message or NSIG request message has been received (Yes in S301), then the participating node adds a predetermined value to a gatenode search starting timer value (Step S303) and ends the process. If a flag is used for confirming, then the set flag is cleared before the process ends. If either an NSIA request message or NSIG request message has not been received (No in S301), then the participating node decrements the gatenode search starting timer value (Step S302).

Then the participating node determines whether the gatenode search starting timer value is 0 (Step S304). If the gatenode search starting time value is not 0 (No in Step S304), then the process ends. If the gatenode search starting time value is 0 (Yes in Step S304), then the participating node searches for in-subnetwork gatenodes and detects the number of existing gatenodes (Step S305).

Figure 8E:
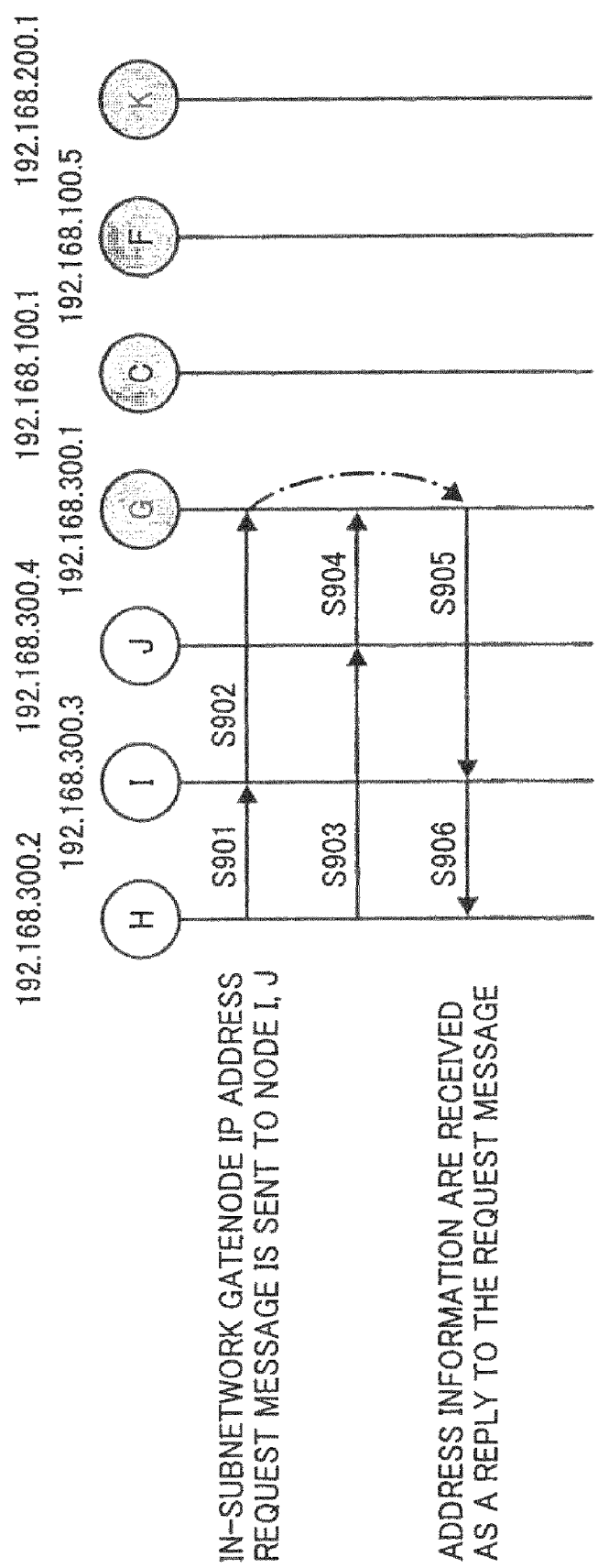
FIG. 8(E) is a flowchart showing a method to obtain address information of in-subnetwork gatenodes using message in the virtual network.

Subsequently, methods for searching in-subnetwork gatenodes and detecting the number of existing gatenodes are explained. The participating node first collects address information of in-subnetwork gatenodes using NSIG request message. FIG. 8(E) is a flowchart showing a method to obtain address information of in-subnetwork gatenodes using a message in the virtual network. In FIG. 8(E), explanation takes place assuming Node H is a searcher node.

Node H sends an NSIG request message to Node J and I, as they are connected to Node H (Step S901). Node I receives the NSIG request message and transfers it to Node G (S902). Node I does not send an NRA message to Node H as Node I is not a gatenode. Node J receives NSIG request and transfers it to Node G (Step S904). Node J does not send an NRA message to Node H as Node J is not a gatenode. Node G receives NSIG request message from Node I. Node G sends an NRA response message to Node I as Node G is a gatenode (Step S905). Node G disposes of the NSIG request message sent from Node J since it is duplicative with the NSIG request message sent from Node I. If NSIG request message sent from J is the first message, Node G disposes of the NSIG message sent from Node I and sends an NRA message to Node J. Further, Node G does not send NSIG request message to out-subnetwork gatenodes. Node I receives NRA response message and transfers it to Node H (Step S906). The participating node finds the number of existing gatenodes by counting the number of gatenodes after collecting address information of the in-subnetwork gatenodes.

After this process, the participating node performs Steps S306 to S312 (FIG. 6). The participating node determines the gatenode search starting timer value randomly (Step S313) after executing Step S312.

Figure 7A:
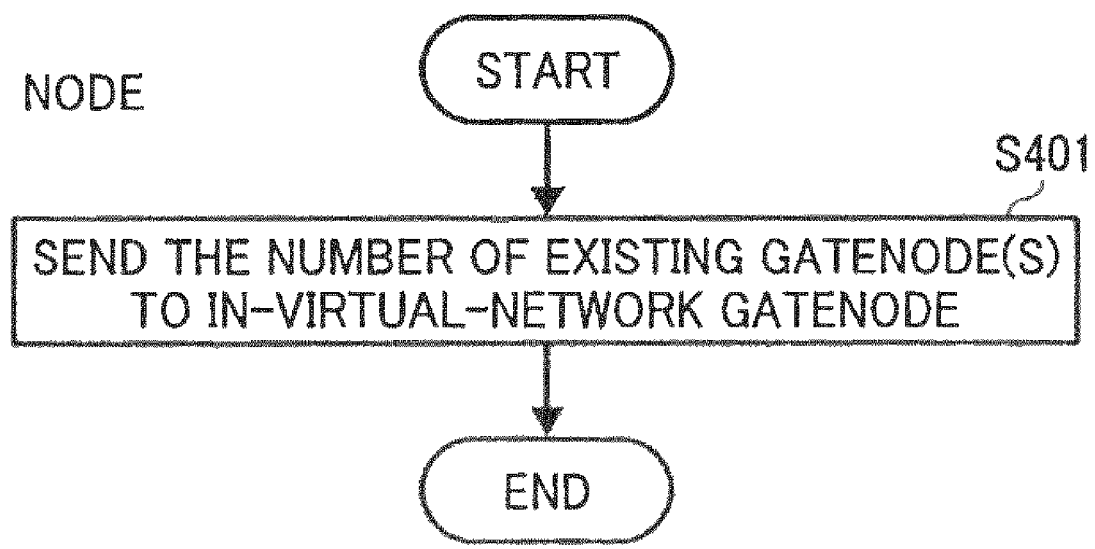
FIG. 7(A) is a flowchart showing a process that a normal node executes after the process of FIG. 6 (Step S313)
Figure 7B:
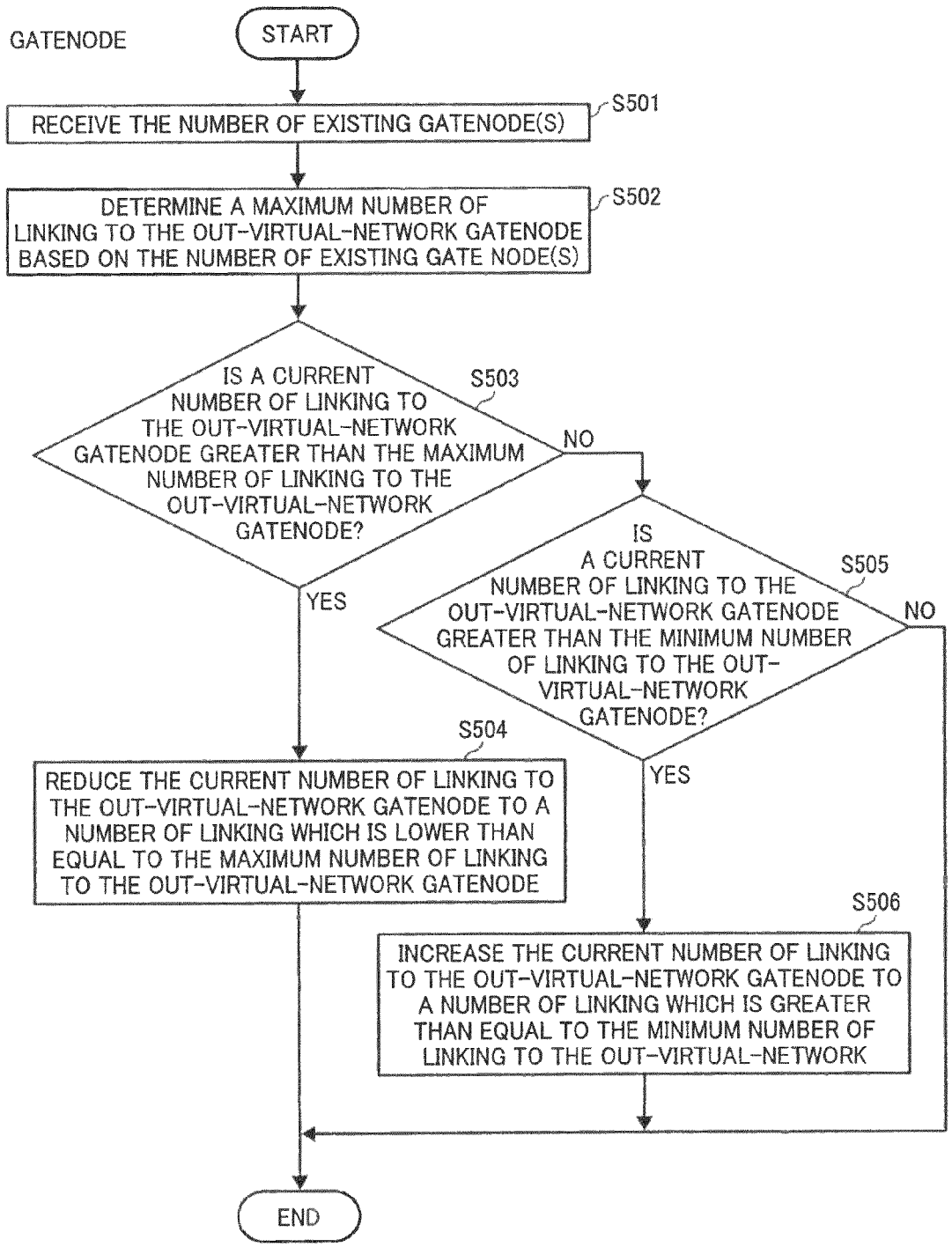
FIG. 7(B) is a flowchart showing a process in which a gatenode dynamically changes the number of links in response to the number of in-subnetwork gatenodes.

A process by which a gatenode dynamically changes the number of links is explained by referring to FIGS. 7(A) and 7(B). FIG. 7(A) is a flowchart showing process that a non-gatenode participating node executes after the process of FIG. 6 (Step S313). The participating node sends the number of existing gatenodes to each in-subnetwork gatenode (Step S401). Because the number of in-subnetwork gatenodes is not large, the participating node directly connects to the gatenodes in the IP network and sends the number of existing gatenodes in a unicast manner. This process can be also done by sending a virtual network message delivering the number of existing gatenodes.

FIG. 7(B) is a flowchart showing a process executed by a gatenode to dynamically change the number of links in response to the number of in-subnetwork gatenodes. The gatenode receives the number of existing gatenodes from the participating node (Step S501). The gatenode determines a maximum number of links to the out-subnetwork gatenodes (step S502). Then the gatenode determines whether the number of out-subnetwork gatenodes is greater than the maximum number of links to the out-subnetwork gatenodes (Step S503). If the number of out-subnetwork gatenodes is greater than the maximum number of links to the out-subnetwork gatenodes (Yes in Step S503), the gatenode reduces the number of links to the out-subnetwork gatenodes to a number lower than or equal to the maximum number of links to the out-subnetwork gatenodes (Step S504). If the number of out-subnetwork gatenodes is less than or equal to the maximum number of links to the out-subnetwork gatenodes (No in Step S503), the gatenode determines whether the number of subnetwork gatenodes is less than the minimum number of links to the out-subnetwork gatenodes (Step S505). If the number of subnetwork gatenodes is less than the minimum number of links to the out-subnetwork gatenode (Yes in Step S505), the gatenode increases the number of links to the out-subnetwork gatenodes to a number greater than or equal to the minimum number of links to the out-subnetwork gatenodes (Step S506). If the number of subnetwork gatenodes is greater than or equal to the minimum number of links to the out-subnetwork gatenodes (No in Step S505), the gatenode ends this process.

FIG. 11 is a flowchart showing behavior of the node link processing unit 62 (see FIG. 2). In the above-mentioned explanation, a link and a temporary-link are explained as a type of link.

In FIG. 11, it is explained that a node sends a link request as a linking node, and another node receives the link request as a linked node.

The node link functions 151, 152 of the linking node sends a link request or a temporary link request to an IP address and a port number of the linked node via each layer of the physical network control layer 7 (Step S1101).

The link reception function 153 of the node link processing unit 15 of the linked node receives the link request or the temporary link request (Step S1102). The link reception function 153 of the linked node determines whether a received request is the link request or temporary request (Step S1103). If the received request is the temporary request (Yes in Step S1103), the linked node registers the linking node to the address information control table and sets the temporarily-link flag of the linking node true (Step S1105). After Step S1105, it proceeds to Step S1106. If the received request is a link request (No in Step S1103), the linked node refers to the address information control table and finds the number of nodes which are already linked, except nodes with a true temporary flag. Then the linked node compares the number of nodes and a predetermined number (upper limit) (Step S1104).

As a result of Step S1104, if the number of nodes is less than the upper limit (No in Step S1104), the linked node registers the linking node by setting the temporarily-link flag of the address information control table false (Step S1105), and the process proceeds to Step S1106. Then the link reception function sends a link request result indicating an establishment of a link to the linking node via each layer of the physical network control layer 7 (Step S1106).

As a result of Step S1104, if the number of nodes is greater than or equal to the upper limit (Yes in Step S1104), the link reception function sends a link request result indicating refusal of link to the linking node via each layer of the physical network control layer 7 (Step S1107).

The node link function 151, 152 of the linking node receives the link request result from the linked node (Step S1108). The node link function 151, 152 of the linking node determines whether the received link request result indicates establishment or refusal of a link (Step S1109).

As a result of determination at Step S1109, if the received link request result indicates establishment of a link (Yes in Step S1109), the node link function 151, 152 registers the linked node to the address information control table (Step S1110) and ends the link request process. In this case, if the link request is a temporary link request, then the node link function 151, 152 sets the temporarily-link flag of the address information control table true.

As a result of the determination at Step S1109, if the received link request result indicates refusal of a link (No in Step S1109), the node link function 151, 152 terminates the link request process to the linked node and begins a link request process to another linked node.

Registering the linked node in the address information control table enables exchanging virtual network messages through the message processing function 62 of the virtual network control layer 6. This system is configured to admit messages that have a relatively low load such as NODE_SEARCH or NODE_RESULT in a temporary linking condition. However, a file search can not be available in the temporary linking condition, but the temporary link has an advantage in being able to collect node addresses infallibly since the temporarily link request is never refused.

The virtual network with a small communication load can be implemented by the above-mentioned embodiments. These embodiments have an advantage in being able to execute a limited search region and to automatically search simultaneously, and to construct the virtual network in which participation and termination are easily done. These embodiments also have an advantage in being able to prevent performance decline in the virtual network by dynamically changing the number of gatenodes since the communication load of the entire system depends on the number of nodes participating. These embodiments also have an advantage in being able to optimize performance of the virtual network by appropriately setting the number of gatenodes and the number of links to the out-subnetwork in response to the number of nodes in the in-subnetwork.

A computer system can perform a portion or all of the processing steps of the embodiments discussed above in response to a processor executing one or more sequences of one or more instructions contained in a memory. Such instructions may be read into a main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system may include at least one computer readable medium or memory for holding instructions programmed according to the teachings of the above-noted embodiments and for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

What is claimed is:

1. A transmission apparatus for participating in a virtual network constructed on a physical IP network, said transmission apparatus comprising:
    a node link monitoring unit configured to search an in-subnetwork node, which is a virtual network node existing within a first IP subnetwork that the transmission apparatus belongs to;
    a gatenode link monitoring unit configured to search an in-subnetwork gatenode, which is a virtual network gatenode existing within the IP subnetwork, wherein the in-subnetwork gatenode is linked to an out-subnetwork node that exists within a second IP subnetwork different from the first IP subnetwork;
    a detecting unit configured to detect a number of in-subnetwork gatenodes that exist within the first IP subnetwork; and a node link processing unit configured to determine whether a node linked to the transmission apparatus is an out-subnetwork gatenode based on the number of in-subnetwork gatenodes existing within the first IP subnetwork; and
    a gatenode determining unit configured to determine a predetermined number of in-subnetwork gatenodes by multiplying a number of in-subnetwork nodes with a predetermined ratio.

2. The transmission apparatus as claimed in claim 1, wherein the node link processing unit is configured to determine that the node linked to the transmission apparatus is the out-subnetwork gatenode if the number of in-subnetwork gatenodes is less than a predetermined number of gatenodes.

3. The transmission apparatus as claimed in claim 1, further comprising:
    a message processing unit configured to send a request message to the virtual network,
    wherein the node link monitoring unit is configured to search the in-subnetwork node by using a broadcast message and the gatenode link monitoring unit is configured to search the in-subnetwork gatenode by using the message processing unit.

4. The transmission apparatus as claimed in claim 1, further comprising:
    an updating unit configured to update a time duration for searching when another node searches the gatenode,
    wherein the time duration for searching indicates a time when the transmission apparatus is going to search the in-subnetwork gatenode; and
    a second gate node link monitoring unit configured to search the in-subnetwork gatenode based on the time duration for searching.

5. The transmission apparatus as claimed in claim 1, further comprising:
    an updating unit configured to update a time duration for searching when another node searches the gatenode,
    wherein the time duration for searching indicates a time when the transmission apparatus is going to search the in-subnetwork gatenode; and
    a second gate node link monitoring unit configured to search the in-subnetwork gatenode based on the time duration for searching.

6. The transmission apparatus as claimed in claim 1, further comprising:
    a transmission unit configured to transmit the number of in-subnetwork gatenodes to the in-subnetwork gatenode; and
    an adjusting unit configured to adjust a number of links to out-subnetwork gatenodes in response to the number of in-subnetwork gatenodes.

7. A method for participating in a virtual network constructed on a physical IP network using a transmission apparatus, comprising:
    searching an in-subnetwork node, which is a virtual network node existing within a first IP subnetwork that the transmission apparatus belongs to, with a node link monitoring unit;
    searching an in-subnetwork gatenode, which is a virtual network gatenode existing within the IP subnetwork, wherein the in-subnetwork gatenode is linked to an out-subnetwork node that exists within a second IP subnetwork different from the first IP subnetwork, with a gatenode link monitoring unit;
    detecting a number of in-subnetwork gatenodes that exist within the first IP subnetwork, with a detecting unit;
    determining whether a node linked to the transmission apparatus is an out-subnetwork gatenode based on the number of in-subnetwork gatenodes existing within the first IP subnetwork, with a node link processing unit; and
    determining a predetermined number of in-subnetwork gatenodes by multiplying a number of in-subnetwork nodes with a predetermined ratio, with a gatenode determining unit.

8. The method as claimed in claim 7, wherein the determining includes determining that the node linked to the transmission apparatus is the out-subnetwork gatenode if the number of in-subnetwork gatenodes is less than a predetermined number of gatenodes.

9. The method as claimed in claim 7, wherein the method further comprises:
    sending a request message to the virtual network, with a message processing unit,
    wherein the searching in-subnetwork node uses a broadcast message and the searching the in-subnetwork gatenode uses the request message.

10. The method as claimed in claim 7, wherein the method further comprises:
    updating a time duration for searching when another node searches the gatenode, wherein the time duration for searching indicates a time when the transmission apparatus is going to search the in-subnetwork gatenode, with an updating unit; and searching the in-subnetwork gatenode based on the time duration for searching, with a second gate node link monitoring unit.

11. The method as claimed in claim 7, wherein the method further comprises:

updating a time duration for searching when another node searches the gatenode, wherein the time duration for searching indicates a time when the transmission apparatus is going to search the in-subnetwork gatenode, with an updating unit; and searching the in-subnetwork gatenode based on the time duration for searching, with a second gate node link monitoring unit.

12. The method as claimed in claim 7, wherein the method further comprises:

transmitting the number of in-subnetwork gatenodes to the in-subnetwork gatenode, with a transmission unit; and adjusting a number of links to out-subnetwork gatenodes in response to the number of in-subnetwork gatenodes with an adjusting unit.

13. A non-transitory computer readable storage medium encoded with instructions which when executed by a transmission apparatus, causes the transmission apparatus to implement a method for participating in a virtual network constructed on a physical IP network, comprising:

searching an in-subnetwork node, which is a virtual network node existing within a first IP subnetwork that the transmission apparatus belongs to, with a node link monitoring unit;

searching an in-subnetwork gatenode, which is a virtual network gatenode existing within the IP subnetwork, wherein the in-subnetwork gatenode is linked to an out-subnetwork node that exists within a second IP subnetwork different from the first IP subnetwork, with a gatenode link monitoring unit;

detecting a number of in-subnetwork gatenodes that exist within the first IP subnetwork, with a detecting unit;

determining whether a node linked to the transmission apparatus is an out-subnetwork gatenode based on the number of in-subnetwork gatenodes existing within the first IP subnetwork, with a node link processing unit; and determining a predetermined number of in-subnetwork gatenodes by multiplying a number of in-subnetwork nodes with a predetermined ratio, with a gatenode determining unit.

* * * * *